US012808724B2

(12) United States Patent
Suzuki

(10) Patent No.: US 12,808,724 B2
(45) Date of Patent: Nov. 24, 2026

(54) TEMPERATURE SENSOR AND METHOD OF MANUFACTURING TEMPERATURE SENSOR

(71) Applicant: SHIBAURA ELECTRONICS CO., LTD., Saitama (JP)

(72) Inventor: Tatsuyuki Suzuki, Saitama (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 1038 days.

(21) Appl. No.: 17/906,318

(22) PCT Filed: Jan. 18, 2022

(86) PCT No.: PCT/JP2022/001627

§ 371 (c)(1),
(2) Date: Jul. 27, 2023

(87) PCT Pub. No.: WO2023/139652

PCT Pub. Date: Jul. 27, 2023

(65) Prior Publication Data

US 2024/0210251 A1 Jun. 27, 2024

(51) Int. Cl.
*G01K 1/08* (2021.01)
*G01K 7/22* (2006.01)

(52) U.S. Cl.
CPC *G01K 1/08* (2013.01); *G01K 7/22* (2013.01)

(58) Field of Classification Search
CPC .................................. G01K 1/08; G01K 7/22
See application file for complete search history.

(56) References Cited

U.S. PATENT DOCUMENTS 7,891,572 B1 * 2/2011 Murray .................... B23P 19/00 236/21 R
9,322,718 B2 * 4/2016 Takahashi ................ G01K 1/16
2002/0075129 A1 * 6/2002 Mizoguchi ............... G01K 1/16 374/E1.021
2006/0013282 A1 * 1/2006 Hanzawa ................. G01K 7/22 374/E1.021

(Continued)

FOREIGN PATENT DOCUMENTS

CN 210036986 U 2/2020
JP H08128901 A 5/1996

(Continued)

OTHER PUBLICATIONS

Office action for Japanese application No. 2022-518276 dated Apr. 13, 2022 and the translation thereof.

(Continued)

*Primary Examiner* — Laura Martin Sweeney
*Assistant Examiner* — Philip L Cotey
(74) *Attorney, Agent, or Firm* — McDonald Hopkins LLC

(57) ABSTRACT

Provided is a thin temperature sensor which can be planarized, without particularly limiting resin materials used for outer layers and an inner layer. The temperature sensor includes: a sensor element including a thermosensitive portion and paired electric wires electrically connected to the thermosensitive portion; and a holder configured to hold the sensor element. The holder includes a housing space that includes a through hole opening on top and bottom surfaces, to house the thermosensitive portion and the electric wires.

15 Claims, 8 Drawing Sheets

(56) References Cited

U.S. PATENT DOCUMENTS

| | | | | |
|---|---|---|---|---|
| 2007/0110124 | A1* | 5/2007 | Shiraki | G01K 1/08<br>374/208 |
| 2015/0292954 | A1* | 10/2015 | Takeda | G01K 7/16<br>374/183 |
| 2019/0265108 | A1* | 8/2019 | Yoshihara | G01K 1/14 |
| 2019/0323901 | A1* | 10/2019 | Mori | G01K 7/22 |
| 2020/0182708 | A1* | 6/2020 | Yoshihara | H02K 11/25 |
| 2020/0249097 | A1* | 8/2020 | Ogura | G01K 7/22 |
| 2020/0363270 | A1* | 11/2020 | Sato | G01K 1/08 |
| 2021/0381905 | A1* | 12/2021 | Hayasaka | H01C 17/06513 |
| 2022/0181076 | A1* | 6/2022 | Wang | G01K 1/08 |

FOREIGN PATENT DOCUMENTS

| | | | |
|---|---|---|---|
| JP | 2002048655 | A | 2/2002 |
| JP | 2003262551 | A | 9/2003 |
| JP | 2012145527 | A | 8/2012 |
| JP | 2012211792 | A | 11/2012 |
| JP | 2019219173 | A | 12/2019 |
| WO | 2019087755 | A1 | 5/2019 |

OTHER PUBLICATIONS

International Search Report (PCT/ISA/210 and PCT/ISA/237) for PCT/JP2022/001627 dated Mar. 1, 2022.

* cited by examiner

TEMPERATURE SENSOR AND METHOD OF MANUFACTURING TEMPERATURE SENSOR

CROSS-REFERENCE TO RELATED APPLICATIONS

This is a National Stage application of PCT international application PCT/JP2022/001627, filed on Jan. 18, 2022, the content of which is incorporated herein by reference in its entirety.

TECHNICAL FIELD

The present invention relates to a thin temperature sensor small in dimension in a thickness direction.

BACKGROUND ART

A temperature sensor includes a sensor element serving as a main body for temperature detection, and a protector covering a main portion of the sensor element. The sensor element includes a thermosensitive body including, for example, a thermistor, and electric wires connected to the thermosensitive body as basic components. The temperature sensor is originally small in dimension in a thickness direction because the thermosensitive body has a minute size. However, to measure a temperature of a narrow site, a thin temperature sensor smaller in dimension in the thickness direction is required. Patent Literature 2 described below discloses a thin temperature sensor having a thickness dimension of 1.5 mm.

For example, Patent Literature 1 discloses a thin temperature sensor in which a sensor element including a thermosensitive body and electric wires connected to the thermosensitive body is covered with a package made of two insulation films (i.e., two layers). As the insulation films, a flexible synthetic resin film having strength, for example, a synthetic resin film made of a polyester resin, polyethylene, polypropylene, nylon, a fluorine resin, a polystyrene resin, or vinyl chloride is used. The two insulation films are joined with the sensor element in between with an adhesive, for example, an epoxy resin-based, polyurethane-based, or unsaturated polyester resin-based adhesive.

However, in the temperature sensor in which the sensor element is covered with the two insulation films, disclosed in Patent Literature 1, a portion of the insulation films in contact with the thermosensitive body protrudes outward, and therefore, the whole of the package cannot be planarized in some cases.

Patent Literature 2 discloses a temperature sensor that can solve the issue about planarization.

The temperature sensor disclosed in Patent Literature 2 includes an inner layer that is formed by heating and curing or by melting and solidifying a pair of sheet-like inner layer materials made of a resin material, and outer layers formed by a pair of sheet-like outer layer materials made of a resin material and having flat surfaces on two sides. In the temperature sensor disclosed in Patent Literature 2, a thermosensitive body, a lead-out wire connected to the thermosensitive body, and a connection portion between the lead-out wire and a lead wire are covered with the inner layer, and are covered with the pair of outer layers by being sandwiched therebetween. According to the temperature sensor disclosed in Patent Literature 2, it is possible to solve the issue about planarization of the whole of the package in Patent Literature 1.

CITATION LIST

Patent Literature

Patent Literature 1: JP 8-128901 A
Patent Literature 2: WO 2019-087755 A1

SUMMARY OF INVENTION

Technical Problem

The temperature sensor disclosed in Patent Literature 2 is formed in such a manner that the pair of inner layer materials are melted by heating and are solidified while the pair of inner layer materials are sandwiched between the pair of outer layer materials. Therefore, it is necessary for the outer layer materials to have a melting point higher than a melting point of the inner layer materials, and the resin material configuring the inner layer materials and the resin material configuring the outer layer materials are limited. In Patent Literature 2, an example in which the inner layer materials are made of FEP (perfluoro (ethylene-propene) copolymer) that is a fluorine resin, and the outer layer materials are made of PTFE (polytetrafluoroethylene) that is a fluorine resin is described.

Therefore, an object of the present invention is to provide a thin temperature sensor which can be planarized, without particularly limiting resin materials to be used.

Solution to Problem

A temperature sensor according to the present invention includes: a sensor element including a thermosensitive portion and paired electric wires electrically connected to the thermosensitive portion; and a holder configured to hold the sensor element.

The holder according to the present invention includes paired second layers disposed to face each other in a thickness direction T, and a first layer disposed between the paired second layers and joined with the paired second layers.

The first layer according to the present invention includes a housing space that includes a through hole opening on top and bottom surfaces, to house the thermosensitive portion and the electric wires.

The housing space according to the present invention preferably includes a first layer including the housing space, and second layers, and the second layers are preferably provided at positions facing one or both of the openings on the top and bottom surfaces of the housing space.

Further, the housing space according to the present invention preferably has enough capacity to house at least a whole of the thermosensitive portion of the sensor element.

The housing space according to the present invention preferably has the opening shape following a shape of the sensor element in a planar view.

The housing space according to the present invention preferably includes a first housing space configured to house the thermosensitive portion, and paired second housing spaces configured to respectively house the paired electric wires, and one ends of the paired second housing spaces preferably communicate with the first housing space.

The paired second housing spaces according to the present invention are preferably provided independently of each other in the first layer except for the one ends communicating with the first housing space, and a distance between the paired second housing spaces is preferably continuously increased as the paired second housing spaces are farther from the one ends.

An adhesive body is preferably placed around the thermosensitive portion inside the first housing space according to the present invention, and adhesive bodies are preferably placed around the electric wires inside the respective second housing spaces.

The adhesive bodies according to the present invention are preferably made of polyvinyl chloride in a gel state.

The paired second layers and the first layer according to the present invention are each preferably made of polyvinyl chloride having a plate shape, and the first layer is preferably greater in thickness dimension than each of the paired second layers.

The present invention provides a method of manufacturing the above-described temperature sensor.

The method includes: to the holder including a housing space that includes a through hole opening on top and bottom surfaces, to house the thermosensitive portion and the electric wires, a first step of housing the thermosensitive portion and the electric wires in the housing space; and a second step of holding the thermosensitive portion and the electric wires in the housing space.

In the second step of the manufacturing method according to the present invention, preferably, an adhesive is supplied to the housing space to hold, in the housing space, the thermosensitive portion and the electric wires housed in the housing space.

The holder in the temperature sensor according to the present invention preferably includes a first layer including the housing space, and second layers. In the second step of the method of manufacturing the temperature sensor, preferably, the second layers are stacked at positions facing one or both of the openings on top and bottom surfaces of the first layer.

Advantageous Effects of Invention

The present invention provides a thin temperature sensor which can be planarized over a range including a portion provided with a thermosensitive portion, without particularly limiting resin materials used for a first layer (inner layer) and second layers (outer layers).

DESCRIPTION OF EMBODIMENT

A preferred embodiment of a temperature sensor according to the present invention is described below.

Figure 1A:
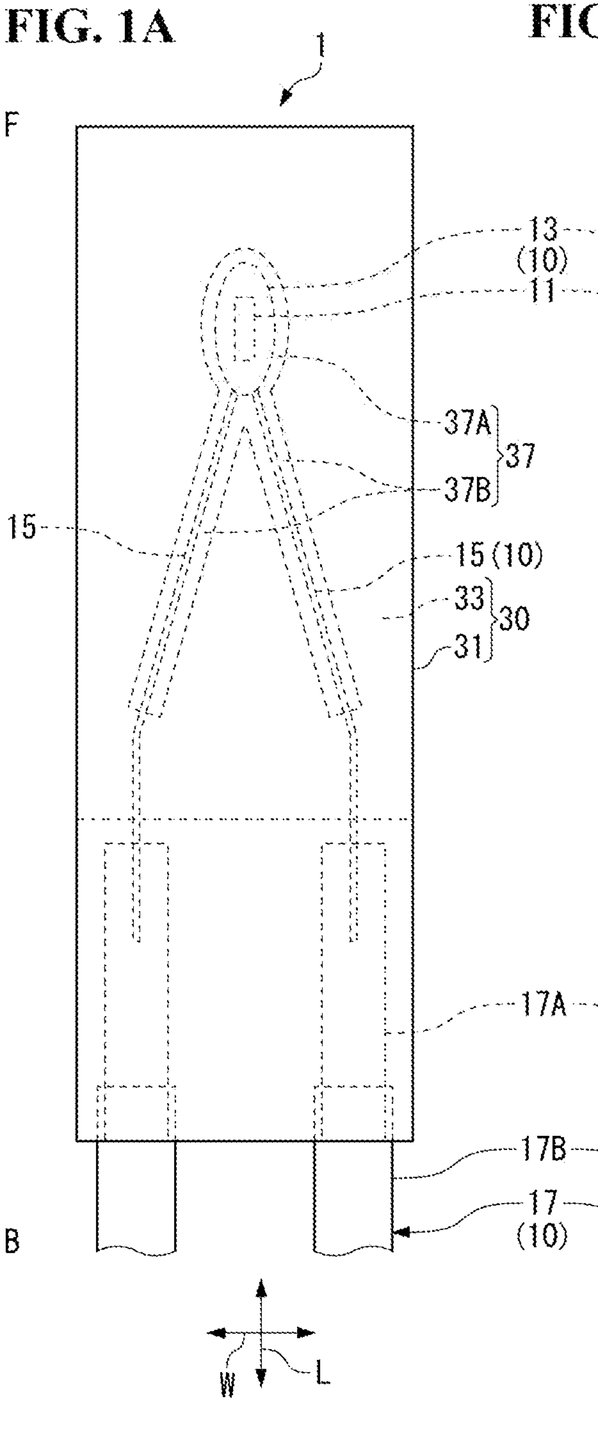
FIGS. 1A and 1B each illustrate a temperature sensor according to a present embodiment, FIG. 1A being a plan view, and FIG. 1B being a side view.
Figure 1B:
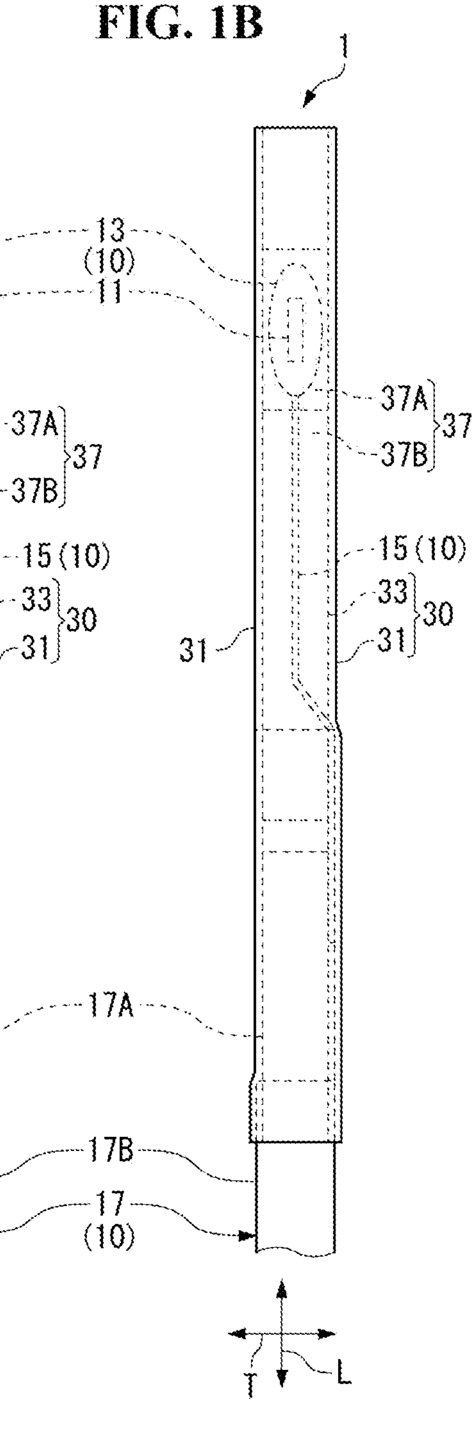

As illustrated in FIGS. 1A and 1B, a temperature sensor 1 according to the present embodiment includes a sensor element 10 serving as a main body for temperature detection, and a holder 30 covering a main portion of the sensor element 10.

The temperature sensor 1 includes, as the holder 30, a first layer 33 housing the sensor element 10, and paired second layers 31 covering top and bottom surfaces of the first layer 33. A housing space 37 housing the sensor element 10 is provided in the first layer 33. As a result, the thin temperature sensor 1 which can be planarized is provided, without particularly limiting resin materials used for the second layers 31 and the first layer 33. In the following, components of the temperature sensor 1 are described, and then a procedure of manufacturing the temperature sensor 1 is described.

Figure 4:
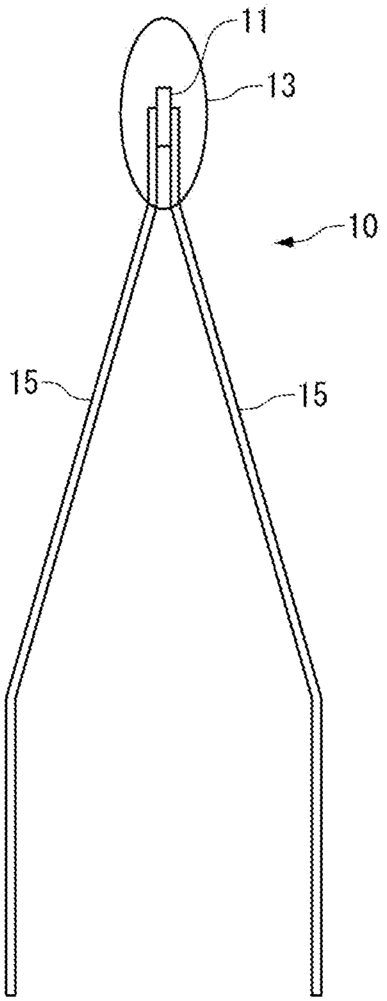
FIG. 4 is a plan view illustrating sensor elements of the temperature sensor according to the present embodiment.

<Sensor Element 10: FIGS. 1A, 1B and FIG. 4>

As illustrated in FIGS. 1A, 1B and FIG. 4, the sensor element 10 includes a thermosensitive body 11, a protector 13 that is made of glass and covers surroundings of the thermosensitive body 11, paired first electric wires 15 directly and electrically connected to the thermosensitive body 11, and second electric wires 17 electrically connected to the respective first electric wires 15. Paired electric wires according to the present invention are configured by the first electric wires 15 and the second electric wires 17 electrically connected. Note that, in the temperature sensor 1, as illustrated in FIGS. 1A, 1B, a side provided with the thermosensitive body 11 is defined as a front side F, and a side on which the second electric wires 17 are drawn out is defined as a rear side B. The sides are relatively defined.

[Thermosensitive Body 11]

As the thermosensitive body 11, for example, a thermistor is preferably used. The thermistor is an abbreviation for a thermally sensitive resistor, and is a metal oxide that detects a temperature by using a property that an electric resistance varies with temperature.

The thermistor is classified into an NTC (negative temperature coefficient) thermistor and a PTC (positive temperature coefficient) thermistor. In the present embodiment, any of the thermistors is usable.

As the NTC thermistor, an oxide sintered body that includes, as a basic composition, a manganese oxide ($Mn_3O_4$) having a typical spinel structure can be used for the thermosensitive body 11. An oxide sintered body including a composition of $M_xMn_{3-x}O_4$ that is obtained by adding M elements (one or more kinds of Ni, Co, Fe, Cu, Al, and Cr) to the basic composition can also be used for the thermosensitive body 11. Further, one or more kinds of V, B, Ba, Bi, Ca, La, Sb, Sr, Ti, and Zr can be added.

Further, as the PTC thermistor, a composite oxide having a typical perovskite structure, for example, an oxide sintered body including $YCrO_3$ as a basic composition can be used for the thermosensitive body 11.

[Protector 13: FIGS. 1A, 1B and FIG. 4]

As illustrated in FIGS. 1A, 1B and FIG. 4, the protector 13 made of glass seals the thermosensitive body 11 and maintains the thermosensitive body 11 in an airtight state, thereby preventing occurrence of chemical and physical changes of the thermosensitive body 11 due to an ambient environment condition where the temperature sensor 1 is used, and mechanically protecting the thermosensitive body 11. The protector 13 made of glass covers front ends of the first electric wires 15 in addition to the whole of the thermosensitive body 11, and seals the first electric wires 15. In the protector 13, a dimension in a thickness direction T (hereinafter, thickness dimension) is not limited as long as the thin temperature sensor 1 is obtainable, but is preferably within a range of 0.3 mm to 0.8 mm, more preferably within a range of 0.4 mm to 0.7 mm, and further preferably within a range of 0.5 mm to 0.6 mm. The thickness dimension of the protector 13 is typically 0.55 mm.

Providing of the protector 13 made of glass is merely a preferred embodiment in the present invention, and only the thermosensitive body 11 is sufficient without the protector 13. Accordingly, in a case where the protector 13 is provided in addition to the thermosensitive body 11, a thermosensitive portion in the present invention is configured by both of the protector 13 and the thermosensitive body 11. In a case where only the thermosensitive body 11 is provided, the thermosensitive portion in the present invention is configured only by the thermosensitive body 11.

[First Electric Wire 15: FIGS. 1A, 1B and FIG. 4]

As illustrated in FIGS. 1A, 1B and FIG. 4, the first electric wires 15 are electrically connected to an unillustrated electrode of the thermosensitive body 11.

The first electric wires 15 are sealed by the protector 13. Therefore, Dumet wires having a linear expansion coefficient close to a linear expansion coefficient of glass are preferably used for the first electric wires 15. The Dumet wire is an electric wire in which an alloy containing iron and nickel as main components is used as a core wire serving as an electric conductor, and the core wire is coated with copper.

A distance between the first electric wires 15 is continuously increased from the front side F; however, the first electric wires 15 extend in parallel toward the rear side B in a range where the first electric wires 15 are connected to the respective second wires 17.

[Second Electric Wire 17: FIGS. 1A, 1B and FIG. 2B]

As illustrated in FIGS. 1A, 1B and FIG. 2B, the second electric wires 17 each include a core wire 17A made of an electric conductor, and an insulation coating 17B covering the core wire 17A. The second electric wires 17 are referred to as two-core parallel wires or simply referred to as parallel wires. The second electric wires 17 are electrically connected to the respective first electric wires 15 at portions of the core wires 17A by welding, a conductive adhesive, or the like. In the core wires 17A of the paired second electric wires 17, the portions connected to the first electric wires 15 are exposed.

Unlike the first electric wires 15, the second electric wires 17 are not limited in linear expansion coefficient, and an optional material can be selected for the second wires 17 as long as the material has predetermined heat resistance and predetermined durability.

[Holder 30: FIGS. 1A, 1B, FIG. 2A, and FIGS. 3A to 3D]

The holder 30 houses and holds the sensor element 10 while securing electric insulation property from outside. Further, the holder 30 is not particularly limited in material to be used, and has a configuration contributing to planarization on the premise of a thin type.

As illustrated in FIGS. 1A, 1B, the holder 30 includes the paired second layers 31 disposed on top and bottom surfaces in the thickness direction T, and the first layer 33 sandwiched between the second layers 31. The housing space 37 is provided in the first layer 33, and main elements of the sensor element 10 are held by the first layer 33 while being disposed inside the housing space 37. In the present embodiment, the first layer 33 is referred to as an inner layer, and the second layers are referred to as outer layers.

[Second Layer 31]

The paired second layers 31 are provided at least at positions facing respective openings on top and bottom surfaces of the housing space 37.

Figure 2A:
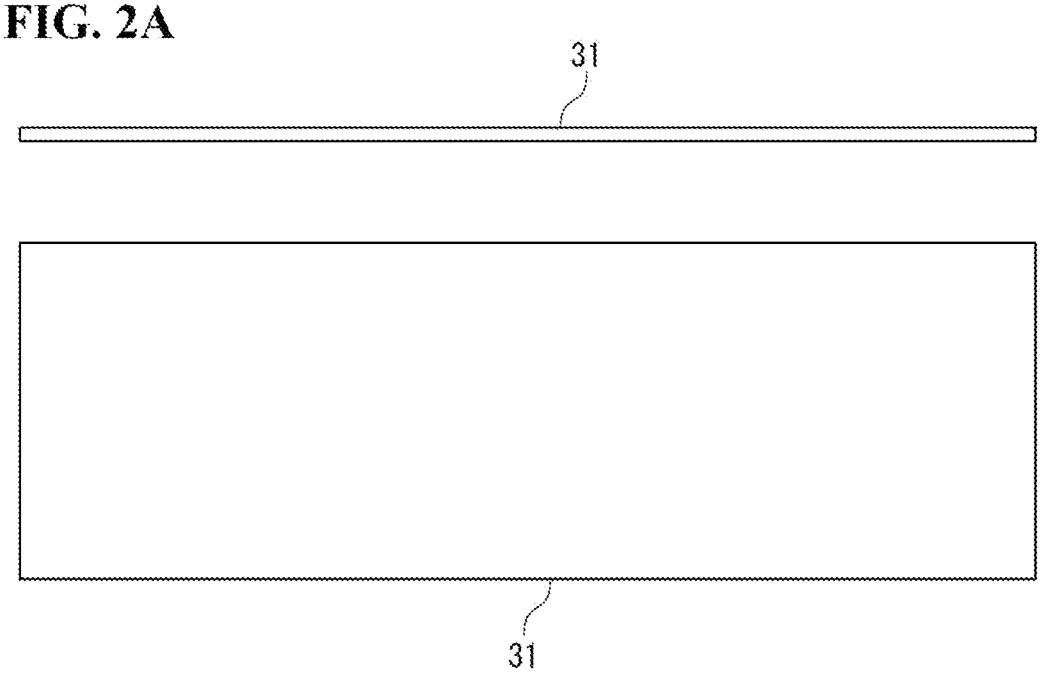
FIGS. 2A and 2B each illustrate elements of the temperature sensor according to the present embodiment, FIG. 2A being a side view and a plan view illustrating a second layer, and FIG. 2B being a plan view illustrating electric wires.
Figure 2B:
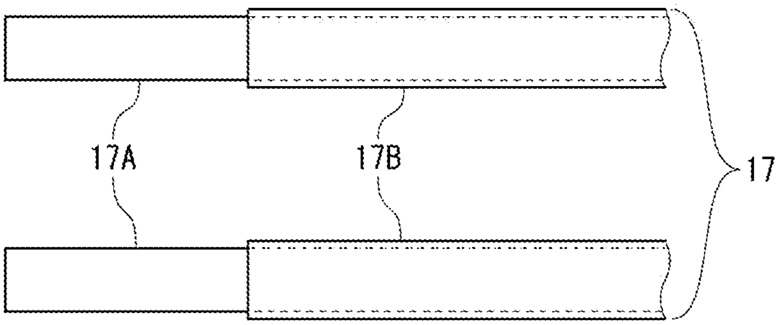
Figure 3A:
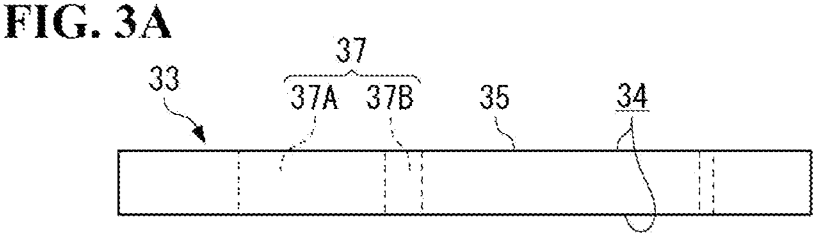
FIGS. 3A to 3D each illustrate a first layer of the temperature sensor according to the present embodiment, FIG. 3A being a side view, FIG. 3B being a sectional view taken along line A-B-A of FIG. 3D, FIG. 3C being a sectional view taken along line A-B-C of FIG. 3D, and FIG. 3D being a plan view.
Figure 3B:
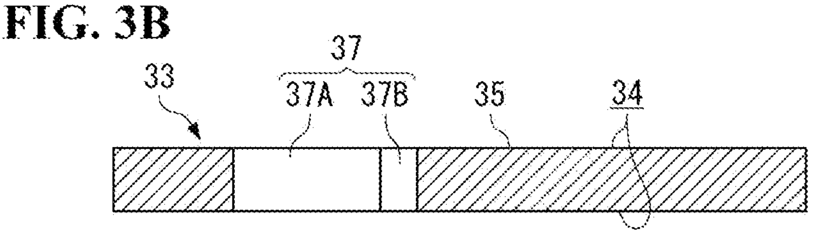
Figure 3C:
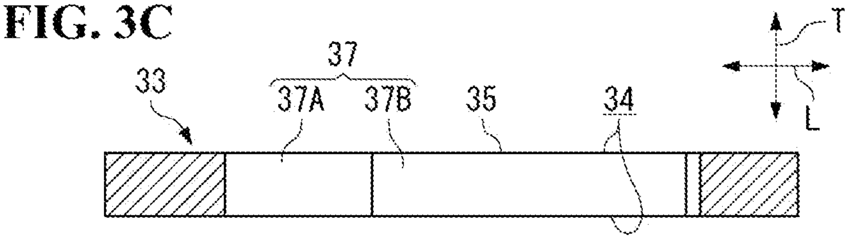
Figure 3D:
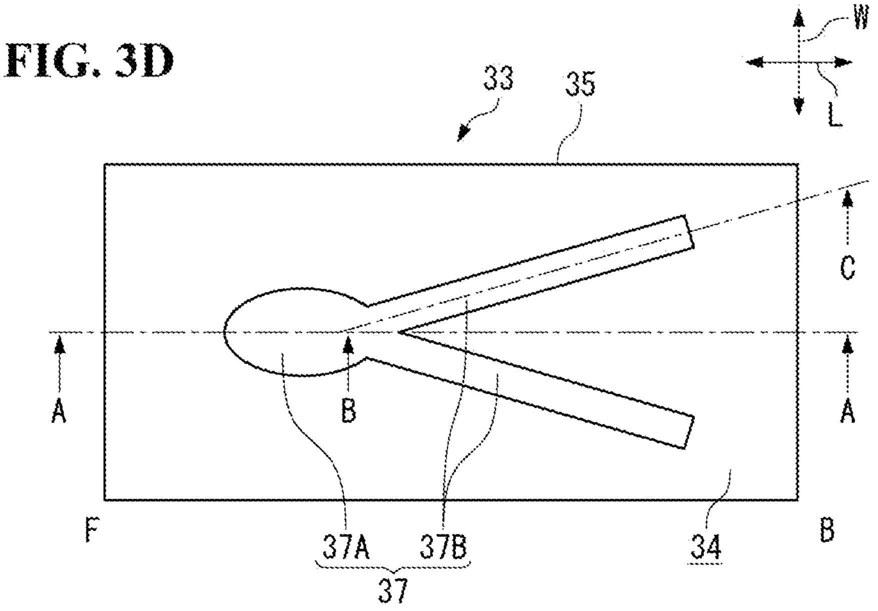

As illustrated in FIG. 2A, each of the second layers 31 is made of a resin material having a rectangular shape in a planar view. As each of the second layers 31, polyvinyl chloride (PVC) having a plate shape is preferably adopted. Polyvinyl chloride has characteristics, for example, stability enabling maintenance of strength for a long time, durability against deterioration, and excellent adhesiveness. Further, polyvinyl chloride also has characteristics of flame resistance higher than flame resistance of other resin materials. Polyvinyl chloride includes a hard material and a soft material, and the soft material is preferably used for each of the second layers 31. The soft material has Shore A hardness within a range of 50 to 100, and is rich in flexibility.

Examples of the resin material adoptable for each of the second layers 31 other than polyvinyl chloride include polypropylene, polyethylene, and polystyrene.

A dimension in the thickness direction T (hereinafter, thickness dimension) of each of the second layers 31 is not limited; however, to realize the thin temperature sensor 1, each of the second layers 31 preferably has the thickness dimension within a range of 0.03 mm to 0.3 mm, more preferably has the thickness dimension within a range of 0.05 mm to 0.2 mm, and further preferably has the thickness dimension within a range of 0.08 mm to 0.15 mm. The thickness dimension of each of the second layers 31 is typically 0.1 mm.

[First Layer 33 and Housing Space 37]

As illustrated in FIGS. 1A, 1B and FIGS. 3A to 3D, the first layer 33 is made of a resin material that has a rectangular shape in a planar view, and has a plate shape similar to each of the second layers 31. However, as described below, the first layer 33 is different in thickness dimension from each of the second layers 31.

The first layer 33 includes a frame body 35 that is made of the resin material and has a rectangular outer shape, and the housing space 37 that includes a void space formed inside the frame body 35. As an example, the housing space 37 penetrates through top and bottom surfaces of the frame body 35, and is continuously formed in the thickness direction T.

The housing space 37 has an opening shape following an appearance shape of the sensor element 10 in a planar view, and includes a first housing space 37A and paired second housing spaces 37B. The first housing space 37A is formed in a substantially elliptical shape in a planar view, and the protector 13 that is made of glass and covers the thermosensitive body 11 is housed in the first housing space 37A. The paired second housing spaces 37B are each formed in a substantially rectangular shape in a planar view, and the first electric wires 15 are housed in the respective second housing spaces 37B.

As an example, the first housing space 37A is provided at a center in a width direction W on the front side F in a length direction L of the frame body 35. In any of the length direction L, the width direction W, and the thickness direction T, the first housing space 37A is formed slightly greater in dimension than the protector 13. Therefore, when the protector 13 is housed in the first housing space 37A, a gap is generated around the protector 13; however, an adhesive body BL is placed in the gap as described below, to hold the protector 13 inside the first housing space 37A. In other words, the first housing space 37A has enough capacity to house the whole of the protector 13 including the thermosensitive body 11. The first housing space 37A has an elliptical shape corresponding to the protector 13. The shape is one preferred shape, and the first housing space 37A may have the other shape, for example, a true circular shape, a rectangular shape, or a polygonal shape. The first housing space 37A is formed to have a shape corresponding to the protector 13, more specifically, is formed to have similarity relationship with the protector 13, which makes it possible to uniformize a thickness of the adhesive body BL placed in the above-described gap. As a result, it is possible to hold the protector 13 with a smaller amount of adhesive body BL.

As an example, the second housing spaces 37B extend from an end on the rear side B of the first housing space 37A toward the rear side B of the frame body 35. However, the second housing spaces 37B are stopped before reaching an end on the rear side B of the frame body 35. This is because, if the second housing spaces 37B extend to the end on the rear side B of the frame body 35, a portion sandwiched between the second housing spaces 37B is separated. The second housing spaces 37B are formed such that a distance therebetween is continuously increased from a portion on the front side F communicating with the first housing space 37A toward the rear side B. This corresponds to the fact that the distance between the first electric wires 15 of the sensor element 10 is continuously increased from a portion on the front side F communicating with the thermosensitive body 11 toward the rear side B.

The frame body 35 is provided between one of the second housing spaces 37B and the other second housing space 37B. Therefore, the second housing spaces 37B are independent of each other except for the portion on one end communicating with the first housing space 37A. Since the frame body 35 is present between the first electric wires 15 housed in the respective second housing spaces 37B, electric insulation between the first electric wires 15 is secured. As a preferred mode, when the adhesive body BL is provided in each of the second housing spaces 37B around the respective first electric wires 15, the first electric wires 15 are positioned in the respective second housing spaces 37B.

A method of forming the housing space 37 is optional as long as a desired shape is obtainable. In consideration of a formation cost and formation efficiency, stamping using a mold is preferable. The housing space 37 penetrating through the top and bottom surfaces is easily obtainable by the stamping. As the other forming method, cutting using a blade, cutting using a laser beam, or the like is usable.

The first layer 33 has the thickness dimension such that the protector 13 of the sensor element 10 can be housed without protruding from the first housing space 37A. The thickness dimension of the protector 13 is as described above, and it is necessary for the first layer 33 to have the thickness dimension coincident with or exceeding the thickness dimension of the protector 13. For example, when the thickness dimension of the protector 13 is 0.55 mm as the typical example, the first layer 33 is made to have the thickness dimension of 0.55 mm, and is preferably made to have the thickness dimension of 0.6 mm with a margin of 0.05 mm.

For example, when the thickness of each of the second layers 31 is 0.1 mm, and the thickness of the first layer 33 is 0.6 mm, the thickness of the temperature sensor 1 can be suppressed to 1 mm while taking into consideration the thickness of the adhesive body BL interposed between each of the second layers 31 and the first layer 33. As a result, the temperature sensor 1 is extremely easily deformable in the thickness direction T in combination with flexibility of polyvinyl chloride configuring the second layers 31 and the first layer 33. Note that a solidified adhesive G is referred to as the adhesive body BL for discrimination.

Figure 5:
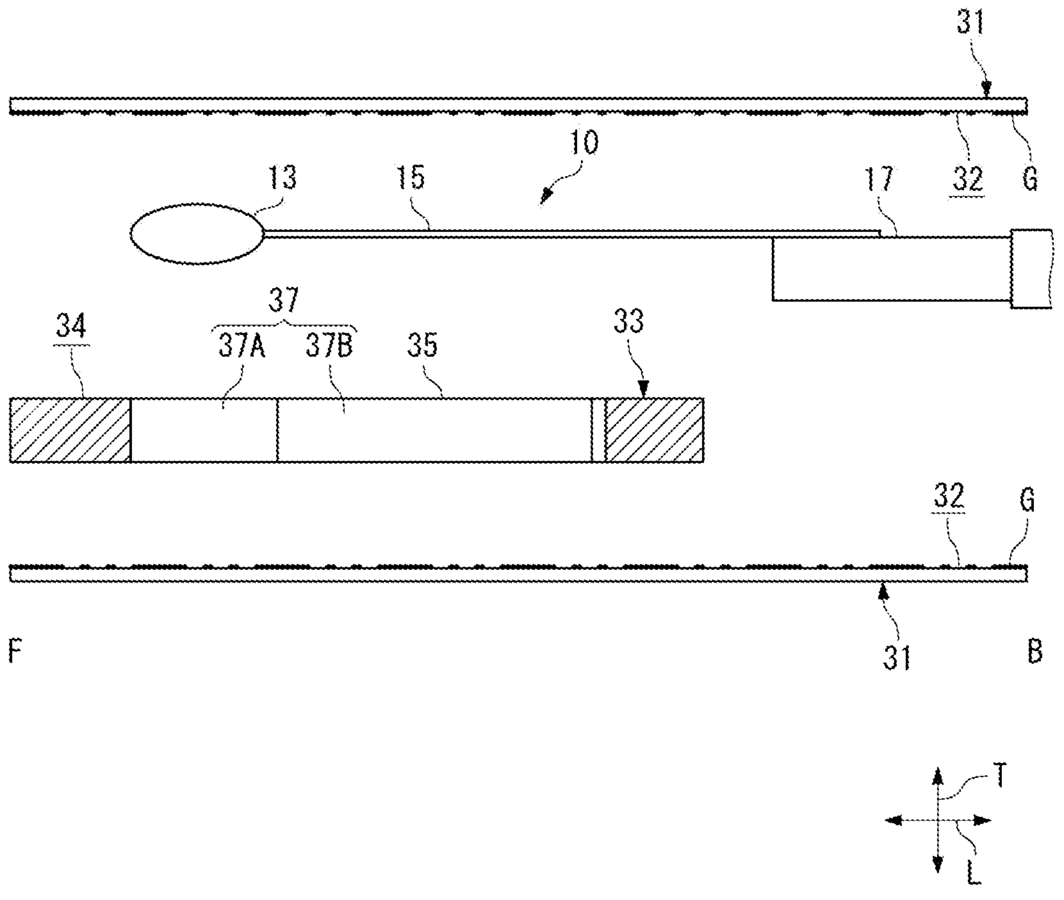
FIG. 5 is a diagram illustrating a procedure of manufacturing the temperature sensor according to the present embodiment.
Figure 6A:
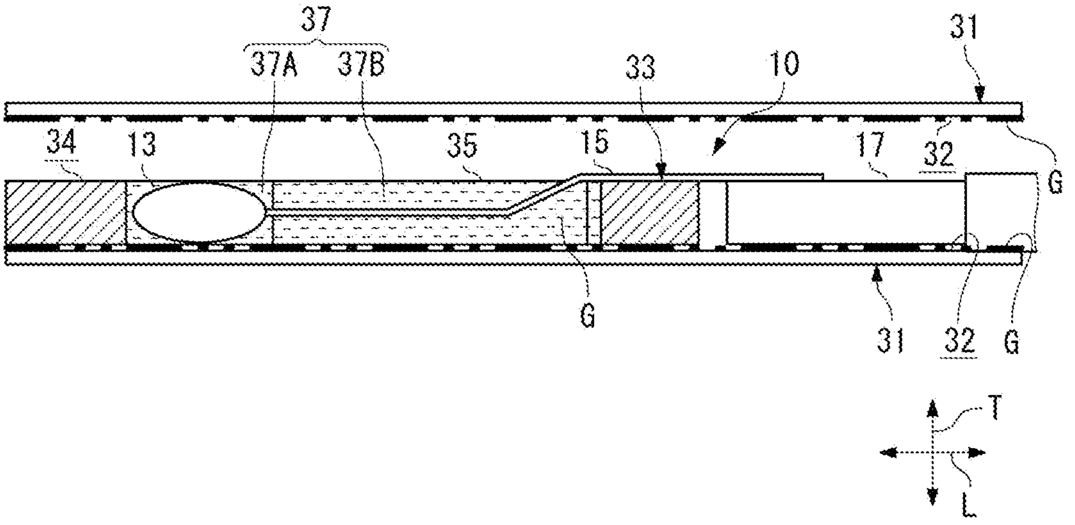
FIGS. 6A and 6B are diagrams illustrating the procedure of manufacturing the temperature sensor according to the present embodiment, subsequent to FIG. 5.
Figure 6B:
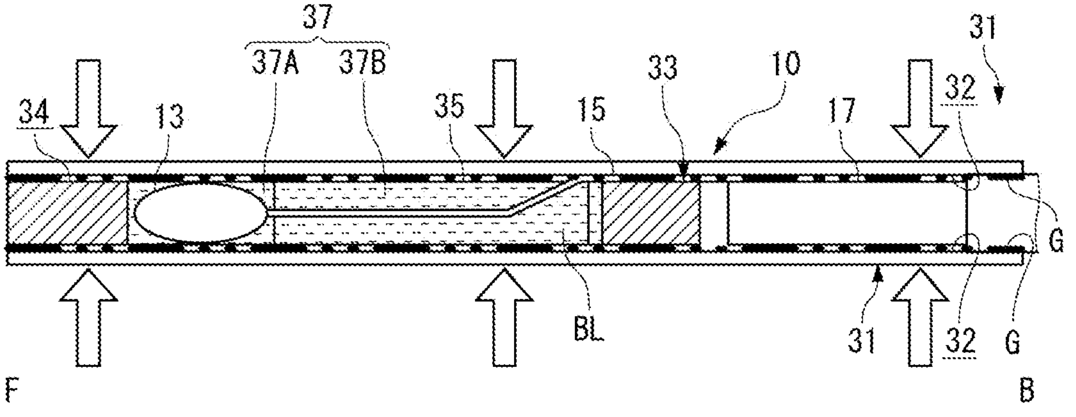

[Manufacturing Procedure: FIG. 5 and FIGS. 6A, 6B]

Next, a procedure of manufacturing the temperature sensor 1 is described with reference to FIG. 5 and FIGS. 6A, 6B.

First, as illustrated in FIG. 5, the first layer 33 and the sensor element 10 are disposed between the second layers 31 provided with a gap therebetween. At this time, the sensor element 10 is positioned with respect to the housing space 37 of the first layer 33, the protector 13 is disposed at a position corresponding to the first housing space 37A, and the first electric wires 15 are disposed at positions corresponding to the respective second housing spaces 37B. It is assumed that the first electric wires 15 and the respective core wires 17A of the second electric wires 17 are already electrically and mechanically connected to each other.

The adhesive G illustrated by an alternate long and two short dashes line in the drawing is applied to each of joining surfaces 32 that are surfaces of the second layers 31 facing the first layer 33. Note that the adhesive G may be applied to each of joining surfaces 34 as top and bottom surfaces of the first layer 33 in place of or in addition to the second layers 31.

The adhesive G is not limited in material as long as the adhesive G can join each of the second layers 31 and the first layer 33, and can hold the main portion of the sensor element 10 inside the housing space 37. However, preferably, the adhesive G made of polyvinyl chloride having a thermosetting property is used. Polyvinyl chloride is known as a thermoplastic resin. As is well known by those skilled in the art, polyvinyl chloride is turned into a sol state excellent in flowability at a normal temperature by being mixed with a plasticizer. Therefore, polyvinyl chloride is easily applicable as the adhesive G. Polyvinyl chloride in the sol state is cured in a gel state by being heated. As an example, a heating temperature for gelation is 200 °C.

Next, as illustrated in FIG. 6A, the first layer 33 is placed on the second layer 31 on a lower side. Subsequently, the protector 13 is housed in the first housing space 37A of the first layer 33, and the first electric wires 15 are housed in the second housing spaces 37B. However, the first electric wires 15 protrude from the second housing spaces 37B on the rear side B behind predetermined positions. Further, in FIG. 6A, the adhesive G is supplied to each of the first housing space 37A and the second housing spaces 37B. A gap between the protector 13 and the frame body 35 in the first housing space 37A is filled with the adhesive G, and a gap between the first electric wire 15 and the frame body 35 in each of the second housing spaces 37B is filled with the adhesive G. Note that, in a case where the adhesive G is made of polyvinyl chloride in the sol state, the adhesive G at this time has flowability.

Next, as illustrated in FIG. 6B, after the second layer 31 on an upper side is placed on the first layer 33, pressing force with heating is applied to the second layers 31. By the heating, the adhesive G made of polyvinyl chloride in the sol state is cured into the gel state. In addition, the first layer 33 receives the pressing force from top and bottom surfaces, which improves joining strength between each of the second layers 31 and the first layer 33 by the adhesive G.

[Relationship Between Diameter R of Protector 13 and Thickness T of First Layer 33]

The temperature sensor 1 illustrated in FIGS. 1A, 1B and FIG. 6B is obtainable through the above-described processes. Relationship between a thickness dimension 13R of the protector 13 and a thickness dimension 37T of the housing space 37 of the first layer 33 is described with reference to FIGS. 7A to 7C.

Figure 7A:
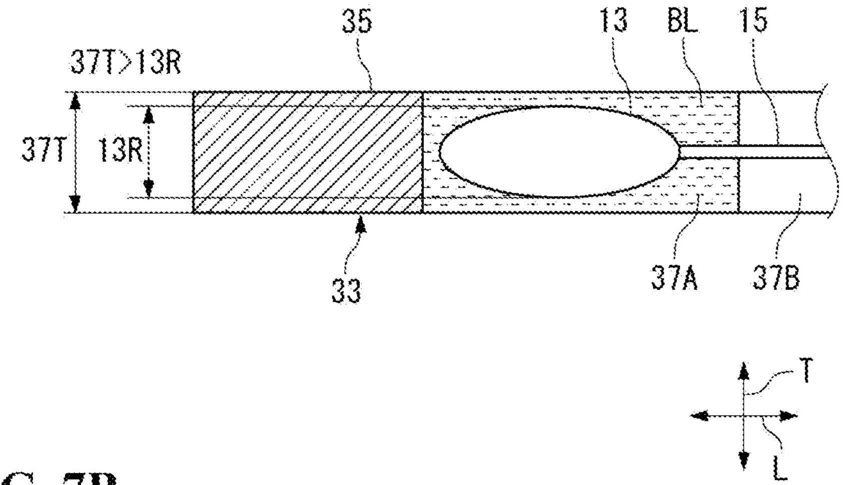
FIGS. 7A to 7C are diagrams to explain limited elements of the temperature sensor according to the present embodiment.
Figure 7B:
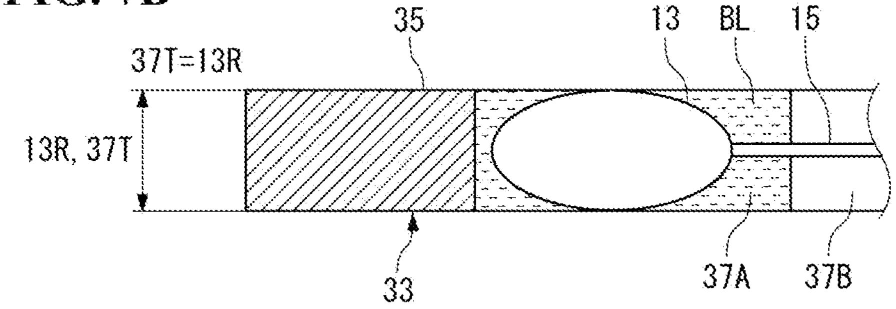
Figure 7C:
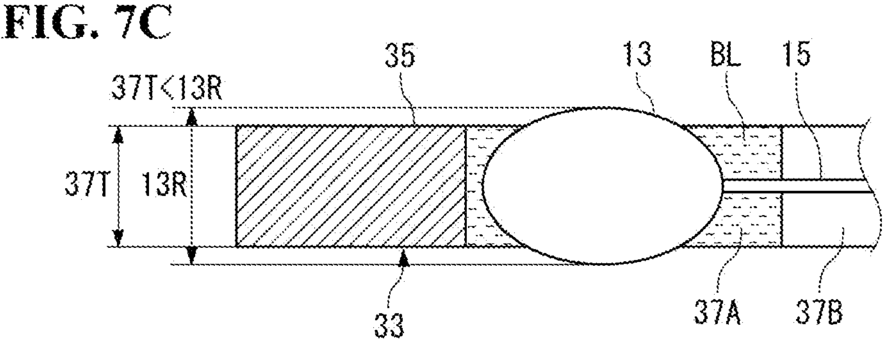

FIG. 7A illustrates a case where the thickness dimension 37T of the first layer 33 is greater than the thickness dimension 13R of the protector 13 (37T>13R), FIG. 7B illustrates a case where the thickness dimension 13R of the protector 13 and the thickness dimension 37T of the housing space 37 are equal to each other (37T=13R), and FIG. 7C illustrates a case where the thickness dimension 13R of the protector 13 is greater than the thickness dimension 37T of the housing space 37 (37T<13R). Note that the relationship 37T>13R, 37T=13R, and 37T<13R are respectively referred to as a first aspect (37T>13R), a second aspect (37T=13R), and a third aspect (37T<13R). The temperature sensor 1 in the second aspect (37T=13R) is described up to here. In the present embodiment, the first aspect (37T>13R) or the second aspect (37T=13R) is adopted, but the third aspect (T<R) is not adopted. The reason is as follows.

Since the temperature sensor 1 is thin, the temperature sensor 1 is disposed in a narrow space and is used. In this state, a load is applied to the temperature sensor 1 from outside in the thickness direction T in some cases. The load is applied to the protector 13 and the thermosensitive body 11 through the second layers 31. When the load is large, the protector 13 made of glass may be damaged, and the thermosensitive body 11 may be damaged. Therefore, in a case where the load may be applied during temperature measurement, it is desirable to suppress the load to the protector 13 and the thermosensitive body 11.

However, since the thickness dimension 13R of the protector 13 in the third aspect in FIG. 7C is greater than the thickness dimension 37T of the housing space 37 of the first layer 33, a portion of the protector 13 protrudes to outside from the first housing space 37A. Although not illustrated, the second layers 31 are disposed on the portion of the protector 13 protruding from the first housing space 37A, but the first layer 33 is not interposed between each of the second layers 31 and the protector 13. Therefore, the load applied from the outside is large as compared with the first aspect and the second aspect.

In contrast, since the thickness dimension 13R of the protector 13 in the first aspect in FIG. 7A is greater than the thickness dimension 37T of the housing space 37, the whole of the protector 13 is housed inside the first housing space 37A. This makes it possible to avoid protrusion of the protector 13 from the housing space 37 as in the third aspect in FIG. 7C. In the first aspect, the adhesive body BL is present on an upper side and a lower side of the protector 13 in the drawing inside the first housing space 37A. Therefore, in the first aspect, even when the load is applied in the thickness direction T, the load is applied to the protector 13 and the thermosensitive body 11 through the adhesive body BL in addition to the second layers 31. In addition, when the adhesive body BL is in the gel state, the adhesive body BL functions as a buffer for the load applied to the protector 13. This makes it possible to reduce the load applied to the protector 13 and the thermosensitive body 11 as compared with the third aspect.

In comparison of a magnitude of the load applied to the temperature sensor 1 from the outside in the thickness direction T, the magnitude of the load in the second aspect (37T=13R) is intermediate between the first aspect (37T>13R) and the third aspect (37T<13R).

Effects

Effects achieved by the temperature sensor 1 according to the present embodiment are described below.

In the temperature sensor 1, the protector 13 and the first electric wires 15 of the sensor element 10 are housed and held in the housing space 37 of the first layer 33. To house and hold the protector 13 and the first electric wires 15 of the sensor element 10, it is sufficient to use the adhesive G as necessary, and it is unnecessary to melt only the first layer 33. Therefore, it is unnecessary to consider relationship of a melting point between the second layers 31 and the first layer 33, and the resin materials configuring the second layers 31 and the first layer 33 are not particularly limited.

Further, in the temperature sensor 1, the diameter R of the protector 13 is set less than or equal to the thickness T of the first layer 33. Therefore, the protector 13 is housed inside the first housing space 37A and does not protrude. Accordingly, the second layers 31 can be formed flat even at the portion of the protector 13 having the greatest thickness dimension in the sensor element 10.

As described above, the present embodiment provides the thin temperature sensor 1 which can be planarized over a range including the portion provided with the protector 13, without particularly limiting resin materials used for the second layers 31 and the first layer 33.

The housing space 37 in the present embodiment includes the first housing space 37A having the shape corresponding to the protector 13, and the second housing spaces 37B having the shapes corresponding to the first electric wires 15. Accordingly, when the protector 13 is disposed in the first housing space 37A, and the first electric wires 15 are disposed in the respective second housing spaces 37B, the sensor element 10 is positioned with respect to the first layer 33, and the thermosensitive body 11 particularly important for the temperature measurement can be positioned at a desired site.

Further, in the temperature sensor 1, the second layers 31 and the first layer 33 are each made of polyvinyl chloride rich in flexibility. In addition, the thickness of the temperature sensor 1 can be suppressed to, for example, about 1 mm to about 2 mm. Accordingly, the temperature sensor 1 is extremely high in flexibility and is easily elastically deformable in the thickness direction T. As a result, in a case where the temperature sensor 1 is provided in a narrow gap, even if a width of the gap is slightly changed, the temperature sensor 1 can maintain a surface contact state with a measurement target by being varied in thickness with the change of the width of the gap.

Although the preferred embodiment of the present invention is described above, the configurations described in the above-described embodiment can be selected, or can be replaced with other configurations without departing from the spirit of the present invention.

Figure 8A:
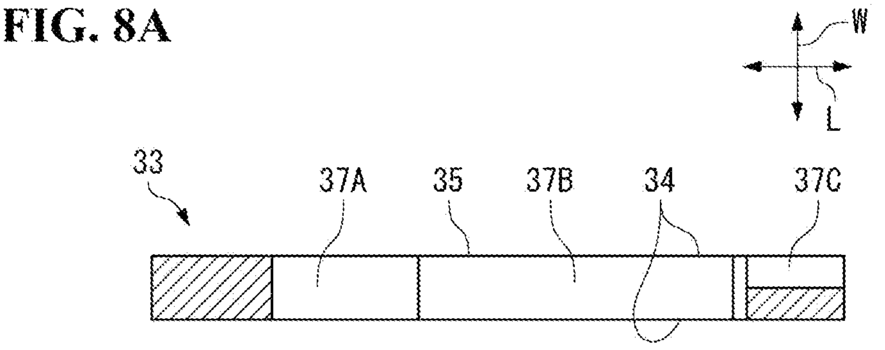
FIGS. 8A and 8B are diagrams illustrating a modification of the first layer.
Figure 8B:
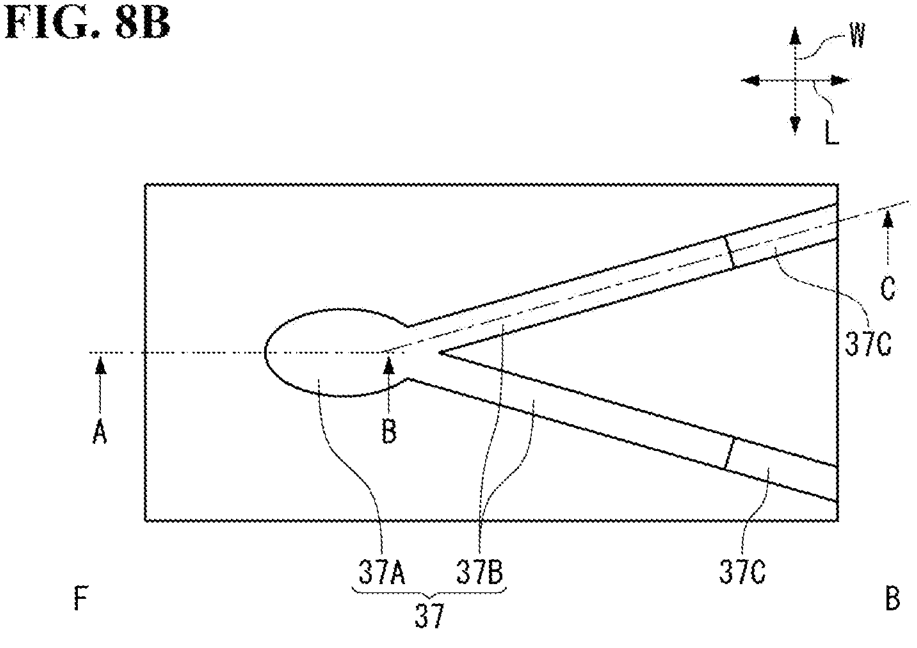

For example, as illustrated in FIGS. 8A and 8B, the second housing spaces 37B provided in the first layer 33 may extend to form extension chambers 37C reaching the end on the rear side B of the frame body 35. As a result, the first electric wires 15 can be housed in the extension chambers 37C, and drawn out from the end on the rear side B. Note that, in FIGS. 8A and 8B, the first housing space 37A and the second housing spaces 37B penetrate through the top and bottom surfaces of the first layer 33; however, as with the extension chambers 37C, the first housing space 37A and the second housing spaces 37B may be each formed in a groove shape up to a predetermined range in the thickness direction T.

In the temperature sensor 1, as the preferred mode of the housing space 37, the first housing space 37A and the second housing spaces 37B are formed to have the shape similar to the shape of the sensor element 10 in a planar view; however, the present invention is not limited thereto. In other words, housing of the protector 13 and the first electric wires 15 is given top priority in the housing space 37, and the shape in a planar view is optional. Accordingly, for example, the housing space 37 may have a rectangular shape in a planar view.

Further, the temperature sensor 1 according to the embodiment has the substantially constant thickness dimension from the front side F to the rear side B as an example; however, the present invention is not limited thereto. For example, when the diameter of each of the core wires 17A of the second electric wires 17 is sufficiently greater than the thickness dimension of the holder 30, the thickness dimensions of the portions of the second layers 31 covering the core wires 17A and the insulation coatings 17B are increased.

In the temperature sensor 1 according to the embodiment, the paired second layers 31 are provided on the top and bottom surfaces of the first layer 33 as the preferred embodiment; however, the present invention is not limited thereto. In other words, it is unnecessary to provide one or both of the second layers 31, for example, as long as the sensor element 10 can be held to the first layer 33 only with an adhesive.

REFERENCE SIGNS LIST

1 Temperature sensor
10 Sensor element
11 Thermosensitive body
13 Protector
15 First electric wire
17 Second electric wire
17A Core wire
17B Insulation coating
30 Holder
31 Second layer
32 Joining surface
33 First layer
34 Joining surface
35 Frame body
37 Housing space
37A First housing space
37B Second housing space
37C Extension chamber
F Front side
B Rear side
G Adhesive
BL Adhesive body

The invention claimed is:

1. A temperature sensor, comprising:

a sensor element including a thermosensitive portion and paired electric wires electrically connected to the thermosensitive portion; and a holder made of a resin material and configured to hold the sensor element, wherein the paired electric wires include first electric wires connected to the thermosensitive portion and second electric wires connected to the first electric wires, wherein the holder includes a first layer, which includes a housing space that includes a through hole opening on top and bottom surfaces, to house the thermosensitive portion and a part of the first electric wires and a pair of second layers respectively joined to the top and bottom surfaces of the first layer, wherein openings of the through hole of the housing space formed on both sides in a thickness direction of the first layer are disposed so as to be covered by the pair of second layers, wherein the housing space has an opening shape following a shape of the sensor element in a planar view, and wherein the first electric wires are drawn out from the housing space beyond a predetermined position, and portions of the first electric wires drawn out from the housing space and connected to the second electric wires are joined to one of the second layers via an adhesive.

2. The temperature sensor according to claim 1, wherein the holder includes the second layers, and the second layers are provided at positions facing one or both of the openings on the top and bottom surfaces of the housing space.

3. The temperature sensor according to claim 2, wherein the pair of second layers and the first layer are each made of polyvinyl chloride having a plate shape, and the first layer is greater in thickness dimension than each of the pair of second layers.

4. The temperature sensor according to claim 2, wherein the housing space has enough capacity to house at least a whole of the thermosensitive portion of the sensor element.

5. The temperature sensor according to claim 2, wherein the housing space includes a first housing space configured to house the thermosensitive portion, and paired second housing spaces configured to respectively house the paired electric wires, and ends of the paired second housing spaces communicate with the first housing space.

6. The temperature sensor according to claim 1, wherein the housing space has enough capacity to house at least a whole of the thermosensitive portion of the sensor element.

7. The temperature sensor according to claim 1, wherein the housing space includes a first housing space configured to house the thermosensitive portion, and paired second housing spaces configured to respectively house the paired electric wires, and ends of the paired second housing spaces communicate with the first housing space.

8. The temperature sensor according to claim 7, wherein the paired second housing spaces are provided independently of each other in the first layer except for the ends communicating with the first housing space, and a distance between the paired second housing spaces is continuously increased as the paired second housing spaces are farther from the ends communicating with the first housing space.

9. The temperature sensor according to claim 8, wherein an adhesive body is placed around the thermosensitive portion inside the first housing space, and adhesive bodies are placed around the electric wires inside the respective second housing spaces.

10. The temperature sensor according to claim 7, wherein
an adhesive body is placed around the thermosensitive portion inside the first housing space, and
adhesive bodies are placed around the electric wires inside the respective second housing spaces.

11. The temperature sensor according to claim 10, wherein the adhesive bodies are made of polyvinyl chloride in a gel state.

12. The temperature sensor according to claim 1, wherein in the thickness direction, the first layer of the holder has a thickness larger than a thickness of the thermosensitive portion.

13. A method of manufacturing a temperature sensor, the temperature sensor including a sensor element and a holder, the sensor element including a thermosensitive portion and paired electric wires electrically connected to the thermosensitive portion, the holder including a first layer made of a resin material and configured to hold the sensor element and a pair of second layers made of a resin material and disposed on both sides of the first layer in a thickness direction, the paired electric wires including first electric wires connected to the thermosensitive portion and second electric wires connected to the first electric wires,
the method comprising:
a step A of forming, in the first layer of the holder, a housing space capable of housing the thermosensitive portion and a part of each of the first electric wires, the housing space being formed as a through hole opening on top and bottom surfaces of the first layer and having an opening shape following a shape of the sensor element in a planar view;
a step B of disposing the sensor element in the housing space; and
a step C of stacking the second layers onto the first layer so as to cover both openings of the through hole of the first layer,
wherein in step B, the first electric wires protrude from the housing space beyond a predetermined position, and
wherein in step C, portions of the first electric wires drawn out from the housing space and connected to the second electric wires are joined to one of the second layers via an adhesive.

14. The method of manufacturing the temperature sensor according to claim 13, wherein, in step B, an adhesive is supplied to the housing space to hold, in the housing space, the thermosensitive portion and the electric wires housed in the housing space.

15. The temperature sensor according to claim 13, wherein
the thermosensitive portion of the sensor element includes a thermosensitive body and a protector which is made of a glass and covers the thermosensitive body, and
wherein in the thickness direction, the first layer of the holder has a thickness larger than a thickness of the protector.

* * * * *